United States Patent [19]

Christoph et al.

[11] Patent Number: 4,606,868
[45] Date of Patent: Aug. 19, 1986

[54] METHOD FOR CASTING THIN-WALLED WORK PIECES OF SYNTHETIC MATERIALS

[75] Inventors: Erich M. Christoph, Obertshausen; Hermann A. Bartels, Muehlheim, both of Fed. Rep. of Germany

[73] Assignee: Ymos Aktiengesellschaft Industrieprodukte, Obertshausen, Fed. Rep. of Germany

[21] Appl. No.: 621,870

[22] Filed: Jun. 18, 1984

[30] Foreign Application Priority Data

Jun. 25, 1983 [DE] Fed. Rep. of Germany ....... 3322931

[51] Int. Cl.⁴ ............................................ B29C 41/18
[52] U.S. Cl. .................................... 264/40.4; 264/71; 264/102; 264/301; 264/302; 264/297.7; 425/256; 425/DIG. 60
[58] Field of Search ............... 264/301, 302, 71, 40.4, 264/102, 297.7; 425/256, DIG. 60

[56] References Cited

U.S. PATENT DOCUMENTS

| 1,506,061 | 8/1924 | Henker | 264/302 |
| 2,991,506 | 7/1961 | Crandall | 264/301 |
| 3,337,662 | 8/1967 | Spencer | 264/71 |
| 3,506,755 | 4/1970 | Rudder et al. | 264/302 |
| 4,063,863 | 12/1977 | Hilmoe | 425/DIG. 60 |
| 4,167,382 | 9/1979 | Freedman | 425/256 |
| 4,473,673 | 9/1984 | Williams | 264/71 |

FOREIGN PATENT DOCUMENTS

| 1149882 | 6/1963 | Fed. Rep. of Germany . |
| 1186197 | 1/1965 | Fed. Rep. of Germany . |
| 1943151 | 4/1970 | Fed. Rep. of Germany . |
| 1949125 | 5/1970 | Fed. Rep. of Germany . |

Primary Examiner—James Derrington
Attorney, Agent, or Firm—W. G. Fasse; D. H. Kane, Jr.

[57] ABSTRACT

A thin-walled work piece of plastics material is cast in a mold by pouring or flowing the plastics material in the form of a plastisol or a flowable powder into a preheated casting mold which is locked to a casting container in a sealed manner to form a closed casting cavity. The mold and the container are then lifted or rotated through at least 180°. A reduced pressure is maintained in the cavity at least prior and during the tilting. After a predetermined time the reduced pressure is removed and the mold and container are tilted back into the starting position. The mold and container are then separated again and the mold is then heated for completion of the jelling or curing whereupon the mold is cooled for removing the work piece from the mold.

11 Claims, 11 Drawing Figures

METHOD FOR CASTING THIN-WALLED WORK PIECES OF SYNTHETIC MATERIALS

FIELD OF THE INVENTION

The invention relates to a method and apparatus for casting thin-walled work pieces of synthetic materials. Such work pieces form hollow bodies, for example, in the form of a cover for an interior vehicle component.

DESCRIPTION OF THE PRIOR ART

German Patent Publication No. 1,943,151 based on U.S. Ser. No. 756,178, filed in the U.S. Patent and Trademark Office on August 29, 1968 by Rogers et al, discloses a method for casting of hollow bodies of flowable synthetic material, whereby an initially cold open casting mold is repeatedly filled and emptied with a plastisol while the mold is being heated in order to cause a coating that is being formed on the interior surface of the casting mold to begin jelling. More specifically, the jelling is caused in that after the first emptying, a hot gas stream is aimed at the outer surface of the casting mold and that after the second emptying the hot gas stream is also directed onto the coating on the interior surface of the casting mold. During both heating steps the casting mold is kept continuously in motion.

One disadvantage of this known method is seen in that it requires the repeated filling and emptying of the casting mold at least in two stages. Furthermore, keeping the mold continuously in motion calls for a substantial investment for the machinery. Furthermore, the casting mold is not closed and therefore any evaporation products cause an environmental problem.

OBJECTS OF THE INVENTION

In view of the above it is the aim of the invention to achieve the following objects singly or in combination:

to provide a method which is simpler and less expensive than the prior art;

to manufacture thin-walled work pieces in a closed mold;

to avoid waste of plastisol;

to avoid keeping the mold continuously in motion during the various manufacturing steps;

to avoid the repeated filling and emptying of the casting mold;

to construct the casting mold in such a way that the formation of air bubbles in the thin-walled work piece is avoided; and to construct the casting mold in such a way that the casting may take place under reduced pressure.

SUMMARY OF THE INVENTION

The above objectives have been achieved according to the invention by the combination of the following features. A preheated casting mold is placed on and locked to a casting container filled with a sufficient quantity of synthetic material. The casting mold and the casting container together form a casting cavity which is tilted or rotated through at least 180°, whereby prior and during the tilting a reduced pressure is maintained in the casting cavity, for example, in the range of 20-50 mbar. After a predetermined length of time, for example, in the range of 10-60 sec the reduced pressure inside the casting cavity is terminated and the casting mold and casting container are returned in unison into their starting position. Thereafter, the casting mold is released from the casting container and transported into a heating station for the curing of the skin which has been formed as a jell on the inner surface of the casting mold. After the curing the mold is cooled for the removal of the thin-walled work piece from the casting mold.

The casting mold thus forms one half of the mold cavity while the casting container forms the other half of the casting cavity. In order to interlock the casting mold and the casting container to each other in a vacuum tight manner, a seal is provided between the two flanges of the mold and container which face each other so that the so formed mold cavity may be evacuated as mentioned above, at least during certain time periods during the casting operations.

According to the invention the mold is filled and emptied only once so that it could be referred to as a single stage system as compared to the prior art which requires at least two filling and emptying stages. Additionally, the present system is preferable from a point of view of protecting the environment because the casting mold is removed from the casting container only after all superfluous plastisol or casting powder is removed out of the casting mold and only the jelled coating remains on the inner surface of the casting mold. This not only reduces waste of material, it also makes it possible to pass the evacuation gas through a cleaner. Another advantage of the invention is seen in that equipment for continuously keeping the mold in motion during the various casting operations is not required.

By performing the present casting under reduced pressure and with a preheated mold, it is possible to produce the thin-walled bodies or work pieces with a surface free of faults. Even the formation of air bubbles in so-called dead spaces inside the mold is prevented according to the invention by the provision of deflection plates inside the mold which properly guide the synthetic material into such dead spaces so that air bubbles cannot remain in the thin-walled product.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 7:
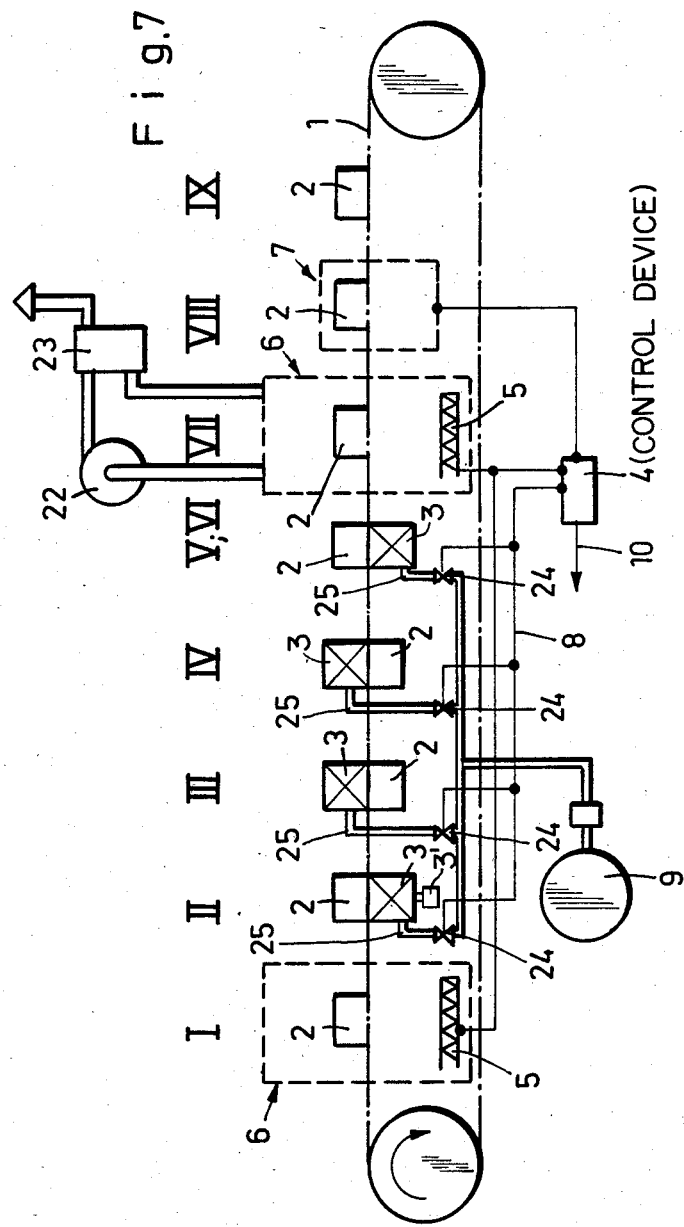
FIG. 7 illustrates in a schematic manner an apparatus according to the invention for performing the several steps of the present method.

Referring first to FIG. 7, the apparatus for performing the present method comprises an endless conveyor 1 which advances one or several casting molds 2 through a plurality of work stations in sequence. Preferably, the conveyor 1 is a chain conveyor which is driven intermittently. The steps I to IX marked in FIG. 7 involve briefly the following operations.

In step I a casting mold 2 is moved by the conveyor 1 into a heating chamber 6 for preheating the casting mold 2 to a sufficient temperature within the range of 80°-160° C. for causing an initial jelling of the synthetic material to be filled into the casting mold 2 in the next step.

In step II the preheated casting mold 2 is brought into alignment with a casting container 3 which may be lifted into the proper position by a conventional lifting mechanism 3' such as a piston cylinder. The casting container 3 already holds a sufficient quantity of synthetic material for the casting. The mold 2 and the container 3 are secured to each other in a vacuum tight manner to form a molding cavity which is evacuated through a valve 24 and flexible hose 25 by an evacuating system 9.

In step III the molding cavity formed by the mold 2 and the container 3 is tilted or rotated through at least 180° to permit the content of the container 3 to flow by gravity into the casting mold 2.

In step IV the closed and still evacuated mold cavity is maintained in the tilted position for a time period, for example in the range of 10-60 sec, sufficient for a jelled film to form on the inner surface of the preheated casting mold 2.

In step V the mold cavity is returned into the original position and maintained in that position for a time period sufficient to return all the excess synthetic material back into the container 3 including by dripping action, within about 10-60 sec.

In step VI the mold 2 and the container 3 are separated from each other after the reduced pressure has been removed and now the conveyor 1 steps on and moves the casting mold 2 into a heater 6.

In step VII the casting mold and thus the jelled skin on the inner surface of the casting mold is heated sufficiently, with a range of 110°-220° C., and for a time period, in the range 3-6 min, sufficient for curing the jelled skin.

In step VIII the conveyor 1 steps the mold 2 into a cooling device 7.

In step IX the finished work piece is removed from the cooled mold 2.

During the steps II, III, IV, and V the conveyor 1 is stationary to permit the application of a vacuum and the removal of the vacuum as well as the rotation of the mold cavity.

Figure 1:
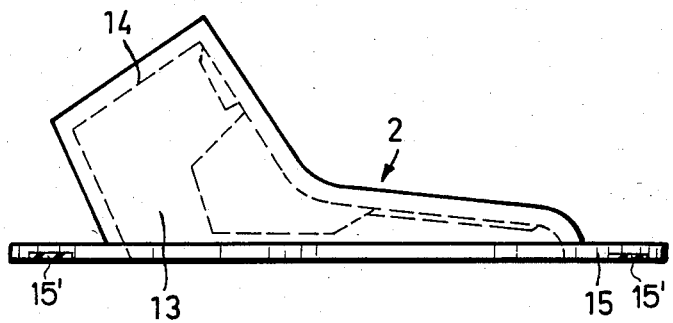
FIG. 1 is a schematic side view of a casting mold according to the invention suitable for practicing the method according to the invention.
Figure 5:
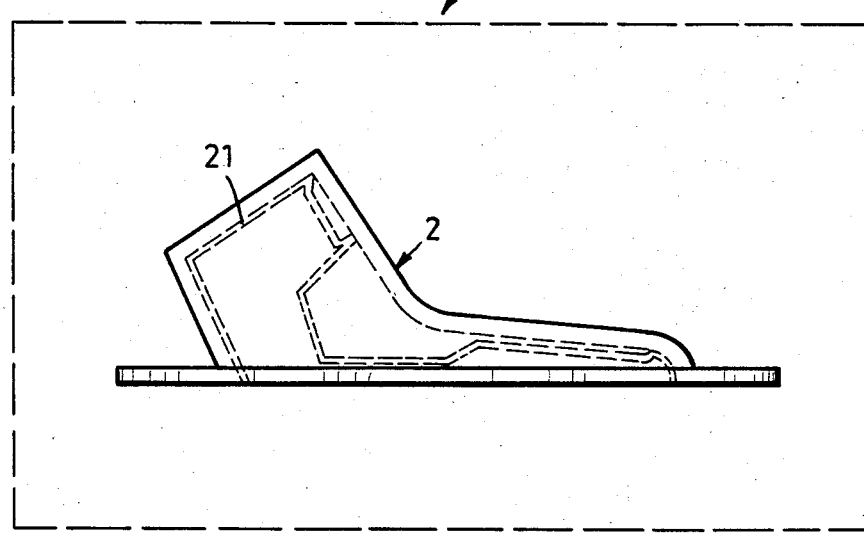
FIG. 5 illustrates the casting mold inside a cooling device after its removal from the casting container.

A conventional control device 4 is operatively connected to the valves 24, to the heating members 5 in the heaters 6, and to the cooling device 7 for controlling these units in timed sequence. The control device 4 controls the valves 24 through a control line 8. The valves are, for example, opened and closed by a conventional solenoid which receives the respective electrical impulse through the control device 4 so that the desired reduced pressure produced by the evacuation device 9 may be applied to the molding or casting cavity formed by the mold 2 and the container 3. As shown in FIG. 1 the casting mold 2 has an inner surface 14 which provides the contour of the work piece 21 to be formed by depositing a jelled skin of synthetic material on that inner surface 14 inside the mold cavity 13 formed by placing the sealing flange 15 provided with an elastic seal 15' on a respective cooperating flange 16 of the mold container 3 as will be described in more detail with reference to FIG. 2.

Figure 2:
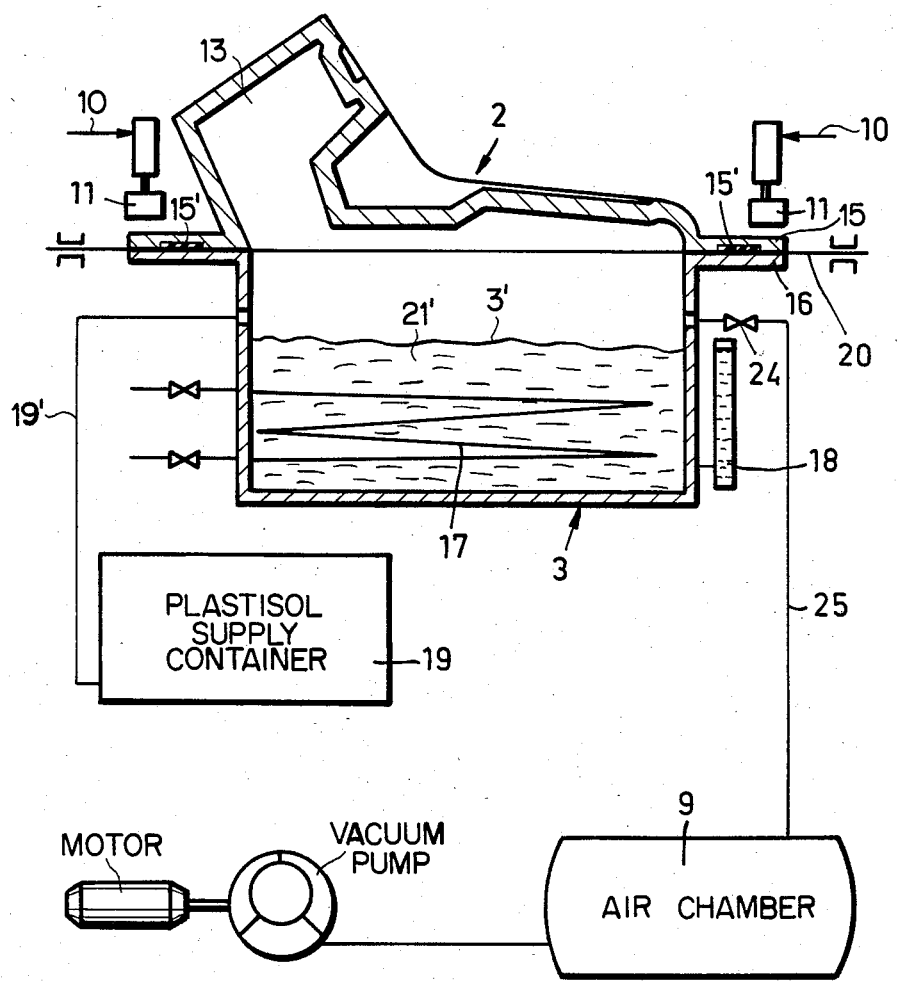
FIG. 2 is a sectional view through a casting mold connected to a casting container to form a mold cavity shown prior to its rotation by at least 180°.

In FIG. 2 the evacuating device 9 comprises an air chamber which is connected on the one hand through a flexible conduit such as a hose 25 and a shut off valve 24 to the casting container 3. On the other hand, the chamber 9 is connected to a vacuum pump driven by a motor. All these components 9, 25, 24 are of conventional construction. Preferably, the valve 24 is connected to the container 3 through a container inlet located above the liquid level 3' shown in FIG. 2. As shown in FIG. 7 the control device 4 is also connected through a control line 10 to a clamping or locking device 11 shown in FIG. 2 for clamping the flanges 15 and 16 to each other in a vacuum tight manner.

Figure 6:
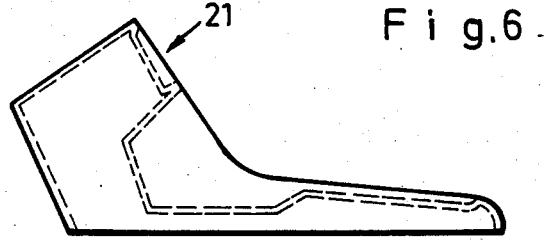
FIG. 6 shows a side view of the finished work piece.

As shown in FIGS. 1 and 6 the work piece 21 has the contour of the inner surface 14 of the mold 2 and the wall thickness of the work piece 21 is comparable to a thin film which later may be used as a cover on a molded body having the same contours or it may be used in turn as a mold placed into a respectively shaped cavity for being filled with a hard foam or the like.

The plastisol 21' in the container 3 shown in FIG. 2 which corresponds to station II in FIG. 7, is maintained at a constant temperature, of about 20°-50° C. by means of tempering coils 17. Depending on the particular requirements and on the type of plastisol used, the coils 17 may provide a cooling or a heating.

A filling level indicator 18 shown in FIG. 2 shows the level 3' of plastisol in the casting container 3. As soon as an operator notices that the level indicated by the level indicator 18 is below a predetermined level, additional plastisol is being filled into the container 3 from a supply container 19 operatively connected to the container 3 through a duct 19' which may include a pump not shown. Such refilling may be accomplished automatically to maintain a predetermined level. Pump means and sensor means for this purpose are well known in the art.

Figure 3:
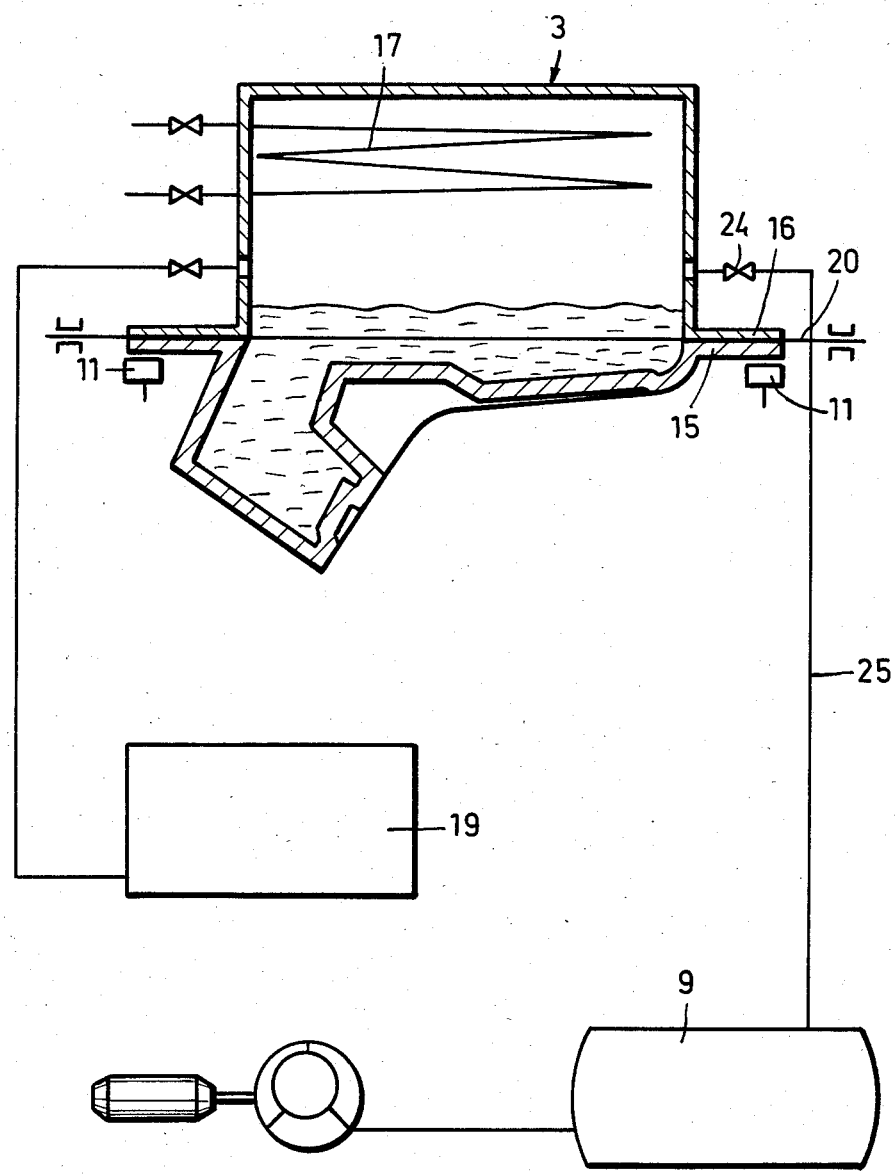
FIG. 3 is a view similar to FIG. 2, however, showing the mold cavity rotated by 180° for filling the casting mold.

In the second step or station shown in FIG. 7, the clamping or locking device 11 is controlled by the control device 4 to securely lock the mold 2 to the container 3 with the flanges 15 and 16 properly aligned for this purpose. As soon as the two components 2 and 3 are locked to each other, the thereby formed molding cavity 13 is evacuated by opening the respective valve 24. Thereafter, the third step is performed by rotating the mold 2 and container 3 as a unit about the axis 20 by 180° so that the synthetic casting material may flow into the casting cavity 13 by gravity. The rotation about the axis 20 is accomplished by conventional means, for example, a gear drive or the like. FIG. 3 illustrates the rotated condition. The respective conduits such as the vacuum conduit 25 are sufficiently flexible and of sufficient length to permit such 180° rotation.

Figure 4:
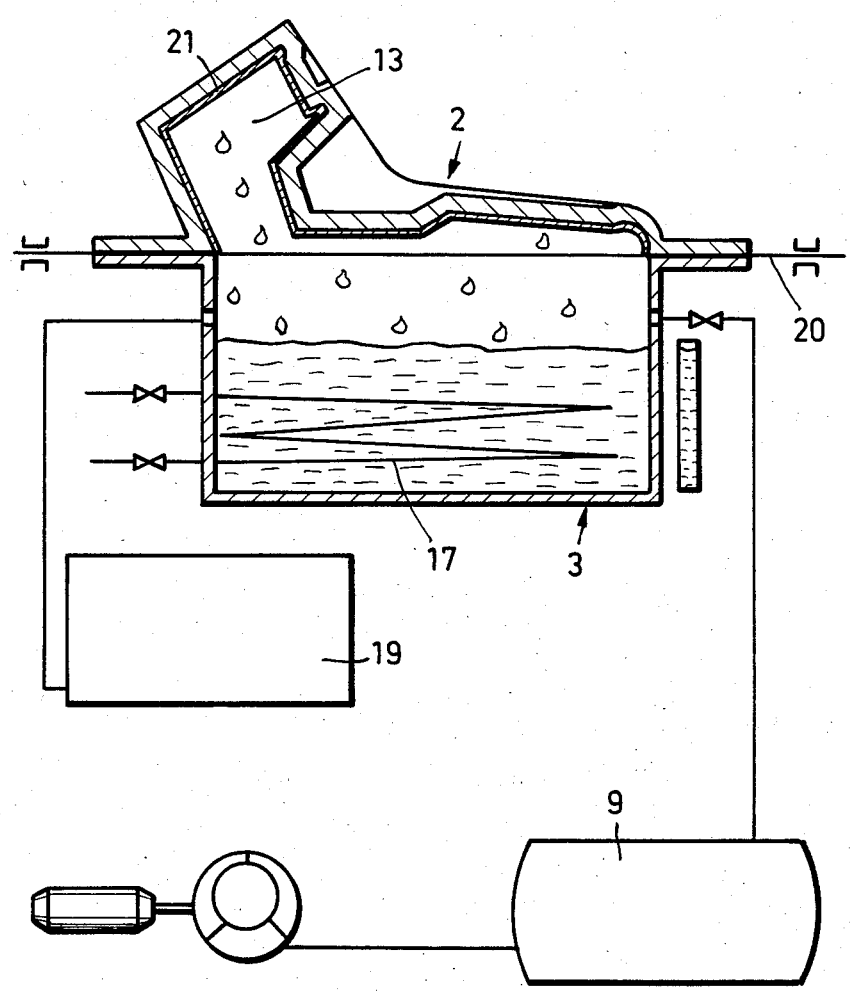
FIG. 4 is a view similar to FIG. 2 with the casting cavity returned into the starting position to permit excess synthetic material to drip back into the casting container.

The condition of FIG. 3 also schematically shown in step III in FIG. 7 is maintained long enough so that the casting material may form a jelled film on the inner surface 14. Once sufficient jelling has taken place, the valve 24 is closed to disconnect the vacuum pump system 9 from the container 3 and the components 2 and 3 are rotated back into the position shown in FIG. 4, whereby any excess casting material may flow back out of the molding cavity 13 into the container 3 and sufficient dripping may take place as indicated in FIG. 4. This situation corresponds to stations or steps V or VI in FIG. 7. At this stage the skin or film forming the work piece 21 in FIG. 4 has a sufficient thickness so that the container 3 may be unlocked from the mold 2 which is now transported by the conveyor 1 into the oven or dryer 6 for a sufficient curing or completion of the jelling of the work piece 21. When the curing is completed the conveyor 1 moves the mold 2 into the cooler 7 where it is cooled for a sufficient length of time, for example, 20-90 sec, and to such a temperature, e.g., 40°-60° C. that the finished work piece 21 may be removed from the mold 2, whereupon it has the shape shown in FIG. 6. The work piece 21 is sufficiently flexible for the removal from the mold 2 even if the latter has a shape such as shown in FIG. 2, for example.

The curing oven 6 is preferably connected to a suction fan 22 connected in series with a gas cleaner 23 which removes the contaminations from the discharge air to pass them back into the heating unit of the curing oven 6 while discharging the cleaned air, depending on its degree of cleanliness back into the atmosphere.

Figure 8:
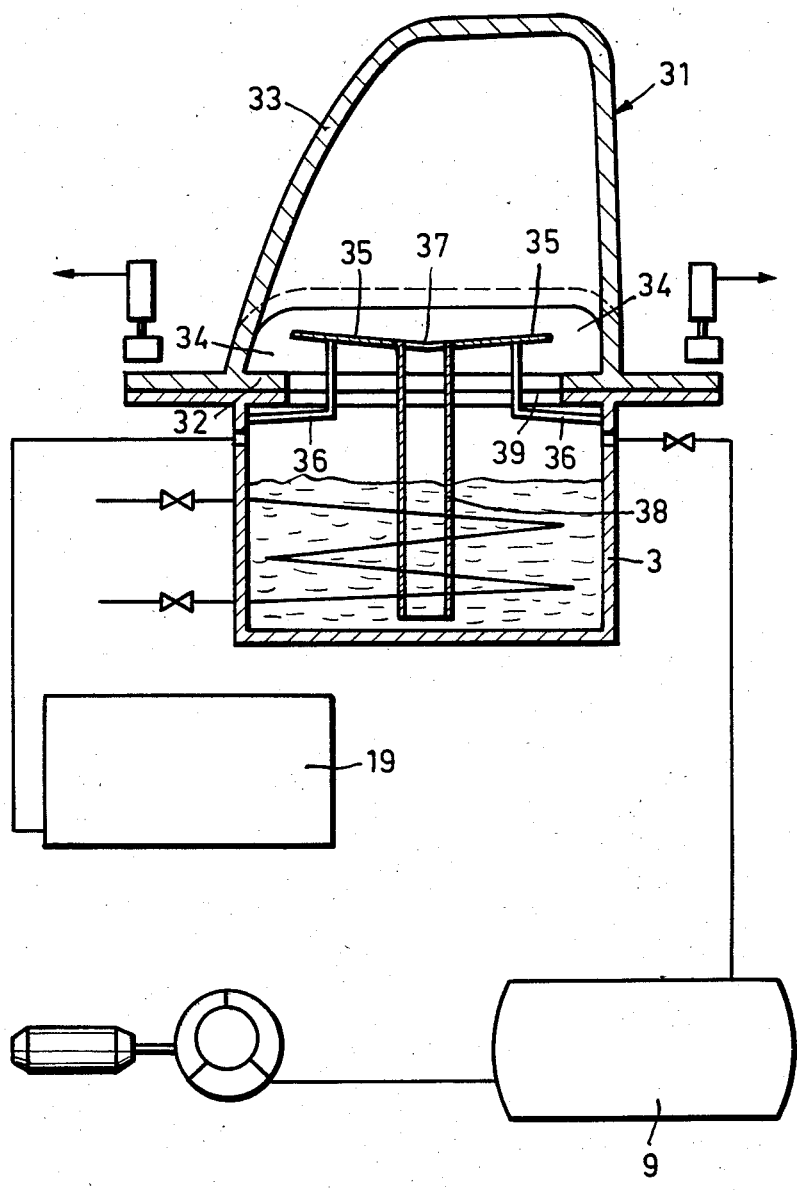
FIG. 8 illustrates a sectional view similar to that of FIG. 2, however, showing a modified mold container for guiding synthetic material into dead spaces of of the mold cavity.
Figure 9:
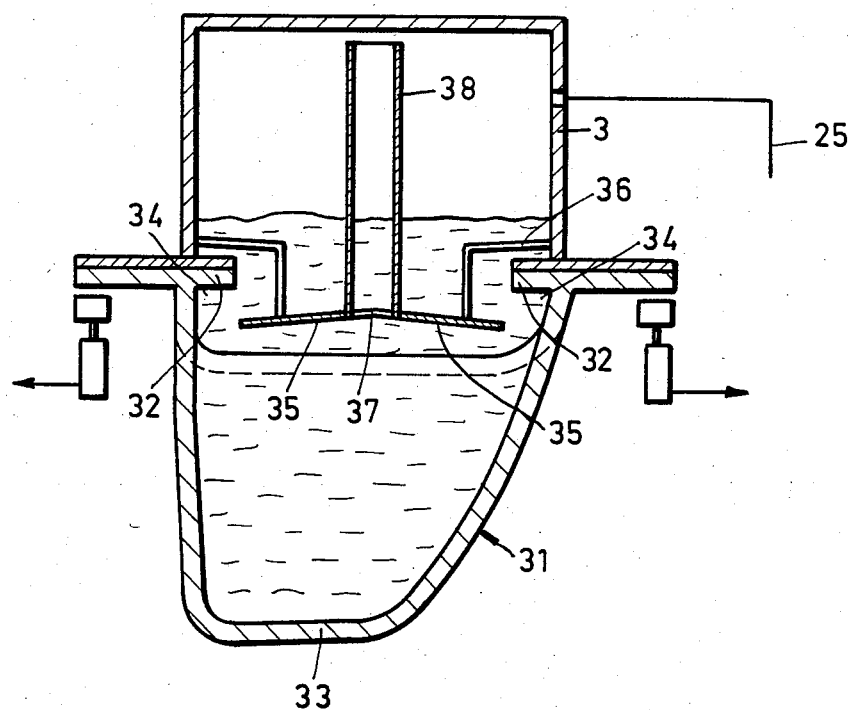
FIG. 9 illustrates the mold cavity of FIG. 8 rotated by 180° for filling the casting mold.
Figure 10:
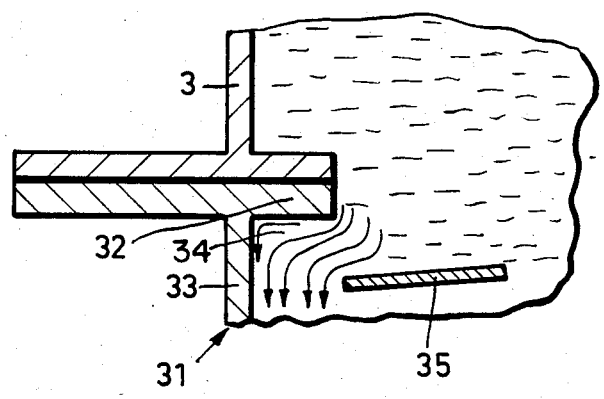
FIG. 10 illustrates a detail according to FIG. 9 to show the guiding of the synthetic material into a dead space.

In those instances where the casting mold 31 shown in FIG. 8 has so-called dead zones 34 it is possible that air bubbles may be included in the film of the finished work piece. The embodiment shown in FIGS. 8, 9 and 10 solves this problem. The casting mold 31 in FIG. 8 is shown in the same position as the mold in FIGS. 2 and 4. In FIG. 9 the mold 31 is shown in a position corresponding to that of FIG. 3. Due to the inwardly reaching flange portions 32 dead zones 34 are formed between the flange 32 and the wall 33 of the mold 31. Deflection plates 35 are mounted with the aid of mounting rods 36 in the container 3 for deflecting the synthetic material flowing into the mold 31 into the dead zones 34 as best seen in FIG. 10 where the arrows illustrate the deflection. These deflection plates 35 are quite effective, even if the synthetic material should be rather viscous. Accordingly, air bubble inclusions in the dead zones are prevented.

The deflection plate 37 or several such plates, depending on the type of mold 31, are so located with the aid of the mounting rod 36 that they are optimally spaced from the dead zones 34 in the mold 31 after the mold 31 has been locked to the container 3. In the illustrated example embodiment the optimal spacing is required relative to the inwardly reaching flange 32. Additionally, the deflection plates 35 must be so located that they do not interfere with the connection of the mold 31 to the container 3, in other words, they must freely pass through the opening 39 into the mold 31. The embodiment shown in FIGS. 8, 9 and 10 is merely an example, because the guide plates will be shaped in accordance with the requirements dictated by any particular type of mold to make sure in any event that the flowing casting material is properly guided into all dead zones to avoid bubbles in the work piece.

As shown in FIGS. 8 and 9, the deflection or guide plates 35 are slanted like a roof so that the air being displaced from the casting container 3 may flow out properly through the ducts 25 when the suction device 9 is operated. To facilitate this purpose the deflection or guide plates 35 are provided with an opening 37 substantially in their center or at their highest point as viewed in FIG. 9. This opening 37 leads into a riser tube 38 and thus into the space being evacuated. The riser tube 38 further assures that the main mass of the synthetic material will flow along the interior walls of the casting container 3 and thus also along the interior walls of the mold 31 as shown in FIG. 9. Dead zones may be located anywhere inside the casting mold and not only near the interior flanges 32. In other words, the deflection or guide plates 35 will be shaped and located in accordance with the individual requirements.

It has been found that the present method is practiced, especially efficiently, when the reduced pressure inside the casting cavity 13 is terminated just prior to returning the casting mold 2 and the casting container 3 back into the starting position. Further, the speed of rotating the casting mold and container should be adapted to the particular casting material so that it will have sufficient time for properly flowing along all inner surfaces of the casting mold.

Figure 11:
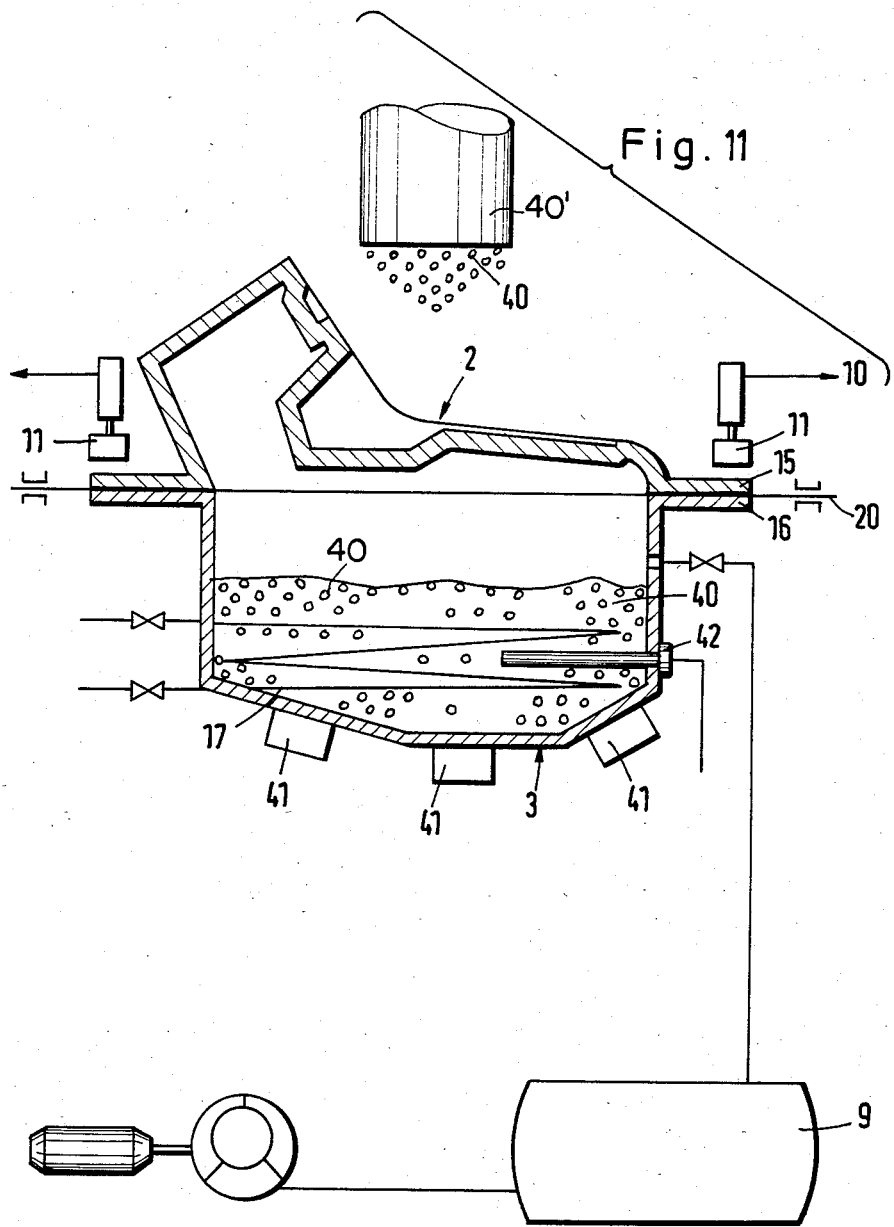
FIG. 11 illustrates a sectional view similar to that of FIG. 2, but showing a casting cavity adapted for forming thin-walled work pieces of a flowable casting powder.

FIG. 11 illustrates an embodiment of the invention for casting a flowable powder of synthetic material rather than a pourable liquid type plastisol. In the embodiment of FIG. 11, the mold 2 is heated to the curing or complete jelling temperature right at the start, whereupon the mold 2 is secured to the container 3 which has already been filled with the powder material 40, for example, through a supply pipe 40'. Vibrators 41 are secured to the container 3 for densifying the powder 40 as much as possible, particularly along the walls. The vibrators 41 are switched on after the mold 2 has been secured to the container 3 and clamped down with the clamping or locking device 11. Thereafter, vacuum is applied to the mold cavity, whereby the exhaustion must be sufficiently gentle so as not to suck the powder out of the container 3. The unit formed by the mold 2 and the container 3 is now rotated through 360° which differs from the above described tilting when the synthetic material is a plastisol. Thus, the casting unit is returned into the starting position, whereupon the rotation through 360° is repeated in the opposite direction, whereby the rotation in both directions takes place with a uniform constant speed. A dwell time of about 0-30 sec is provided at the 180° point and at the 360° return point. The vacuum is switched off at the earliest when the return rotation starts. At the latest the vacuum is switched off when the starting position is reached. However, the vibrators 41 are kept operating for a short time beyond the time when the vacuum is switched off in order to shake off excessive synthetic material powder from the interior surface of the jelled film of synthetic powder adhering to the interior surface of the mold 2.

Thereafter, the clamping device 11 is released and the mold 2 and the container 3 are separated from each other. If necessary, the mold 2 may be moved into a further oven for any additional jelling or curing that may be required. The final steps again involve cooling of the mold and removal of the finished work piece from the mold.

As mentioned, the container 3 is filled with the powder 40 prior to securing the mold 2 to the container 3. The best time for filling the container 3 with powder is when the mold 2 is passing through the stations 7, 8 and 9 in FIG. 7. Further, it is suitable to loosen up the powder while it is being filled into the container 3. For this purpose a comb or stirrer 42 is arranged to reach into the container 3 as shown in FIG. 11. The stirrer 42 is moved mechanically by conventional means.

Although the invention has been described with reference to specific example embodiments, it will be appreciated, that it is intended, to cover all modifications and equivalents within the scope of the appended claims.

What is claimed is:

1. A method for casting thin-walled work pieces of synthetic material, comprising the following steps:
   (a) preheating a casting mold (2),
   (b) maintaining a quantity of flowable powder of synthetic material in a casting container (3) substantially to a predetermined filling level,
   (c) closing the casting container (3) with the preheated casting mold (2) to form a liquid and pressure tight casting unit enclosing a casting cavity (13),
   (d) beginning to vibrate the casting unit and evacuating the casting cavity to a reduced pressure while the casting unit is vibrating, said reduced pressure being just sufficient to remove air from said casting cavity but also insufficient to suck said flowable powder out of said casting cavity,
   (e) rotating the casting unit in one direction through 180° from a mold-up starting position into a mold-down casting position, and providing a dwell time for permitting said flwoable powder of synthetic material to move into said preheated casting mold in the mold-down position, further rotating said casint unit in the same direction back to the starting mold-up position, providing a dwell time in said starting mold-up position, and then rotating the casting unit in the opposite direction again in two steps of 180° each with a dwell time at the casting position and at the starting position for uniformly covering the casting mold surfaces with a powder layer of substantially uniform thickness throughout,
   (f) said dwell times permitting the flowable powder of synthetic material to begin to form a jelled skin on the inner surface of said preheated casting mold,
   (g) permitting any excess flowable powder of synthetic material to move back into said casting container when said casting unit is in the last mentioned mold-up position,
   (h) removing the casting mold from the casting container and moving the casting mold into a heating station for curing the work piece which has formed as said jelled skin on the internal surfaces of the casting mold, and
   (i) after curing, cooling the casting mold and removing the work piece from the casting mold.

2. The method of claim 1, further comprising monitoring the filling level of flowable powder of synthetic material in said casting container, and keeping said filling level at the same level for casting work pieces of the same type.

3. The method of claim 1, further comprising maintaining the temperature of the flowable powder of synthetic material present in the casting container at a constant temperature level for each filling.

4. The method of claim 3, wherein said constant temperature level is a temperature within the range of 20° C. to 50° C.

5. The method of claim 1, further comprising moving the casting container and the casting mold through a plurality of work stations in which said steps are performed.

6. The method of claim 1, further comprising terminating said reduced pressure prior to said step of returning said casting container and the casting mold into the starting position.

7. The method of claim 1, wherein said closing and removing steps are performed in a timed sequence.

8. The method of claim 1, further comprising sequentially passing said casting mold through a first continuous heater means for heating said casting mold to a temperature sufficient for said flowable powder of synthetic material to begin to jell, and then passing said casting mold through a second continuous heater means for heating said casting mold to a temperature sufficient for completion of the jelling of said flowable powder of synthetic material or for curing said flowable powder of synthetic material.

9. The method of claim 1, further comprising deflecting said flowable powder of synthetic material in said casting cavity for guiding said flowable powder of synthetic material into any dead spaces inside said casting mold.

10. The method of claim 1, further comprising terminating said evacuating prior to stopping said vibrating of said casting cavity for moving said flowable powder of synthetic material into all recesses of said casting mold and to shake off excessive flowable powder material from the interior surface of the jelled skin.

11. The method of claim 1, further comprising loosening up said flowable synthetic material inside said casting cavity.

* * * * *